April 23, 1929.  O. TAYLOR  1,710,439
PIPE PRESSURE TESTING PLUG
Filed Sept. 22, 1926
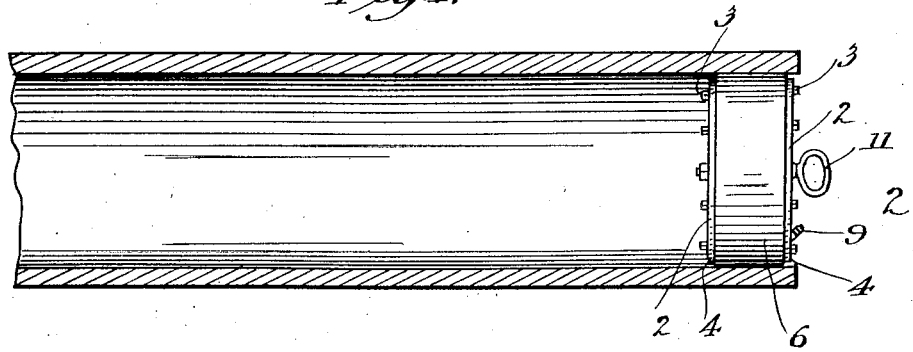
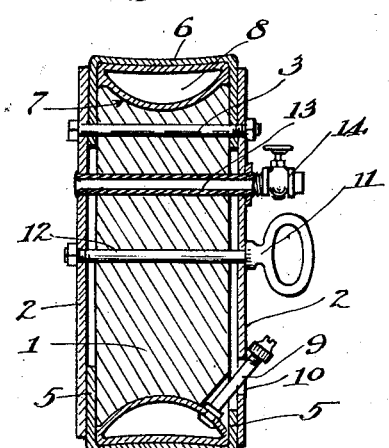
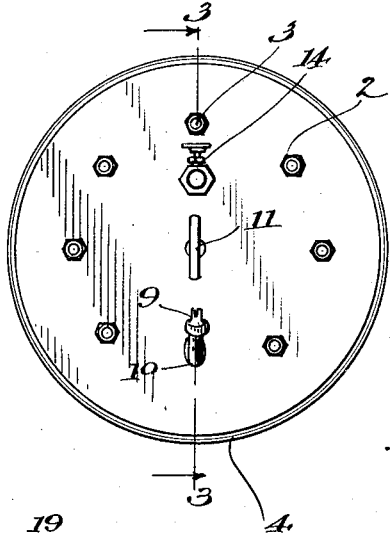
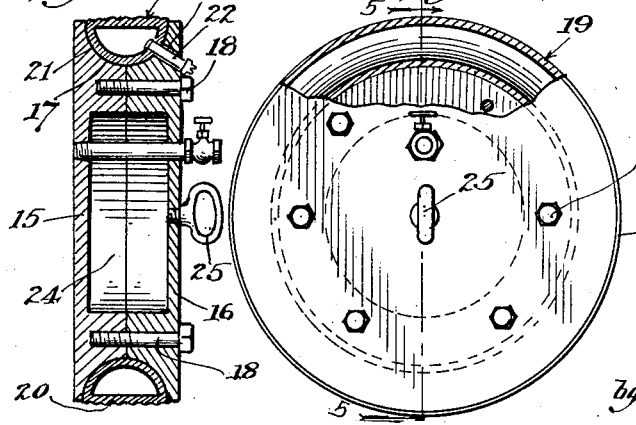
Inventor:
ORSON TAYLOR.
by Hazard and Miller
Attorneys Patented Apr. 23, 1929.

1,710,439

UNITED STATES PATENT OFFICE.

ORSON TAYLOR, OF LOS ANGELES, CALIFORNIA.

PIPE-PRESSURE-TESTING PLUG.

Application filed September 22, 1926. Serial No. 137,035.

My invention is a pipe pressure testing plug to form a closure for open pipes to test same under pressure.

An object of my invention is the construction of a pipe pressure testing plug to be inserted in the end of an open pipe and expanded to form a closure for the end of the pipe, whereby a length of piping as installed may be tested by pressure or pipes when manufactured may be tested by inserting plugs in each end.

A more specific object of my invention is the forming of the seal between the plug and the pipe by an expandible packing, such preferably being a tube or the like expanded by air pressure.

In constructing my invention I form a plug having a supporting structure with a hollow packing in the form of a tube or a tube with a suitable protecting cover and expand the tube by air pressure, this having a suitable valve for inflation and for deflation. Hence the plug may be easily and quickly inserted and connected to a pipe and by deflation of the packing quickly removed.

My invention is illustrated in the following drawings, in which:

Figure 1 is a sectional view of a pipe showing my plug in side elevation;

Fig. 2 is an end view of the plug as if taken in the direction of the arrow 2 of Fig. 1;

Fig. 3 is a longitudinal section of the plug on the line 3—3 of Fig. 2 in the direction of the arrows;

Fig. 4 is a face view partly broken away, of an alternative construction type of a plug;

Fig. 5 is a vertical longitudinal section on the line 5—5 of Fig. 4.

In the construction of Figs. 2 and 3, the plug is formed with a supporting structure 1 which may be designated as the plug body. This is indicated as being of a wooden structure with side plates 2 on each side, these plates being bolted together by bolts 3 and gripping a flexible wearing band 4, this band being in the form of a ring and having flanges 5 extending inwardly radially and having the circumferential portion 6 to bear against the pipe.

The periphery of the plug body is formed with an annular concave surface 7 and a hollow flexible and expandible tube 8 is fitted in the portion 7 between same and the wearing band 4. This latter is preferably formed of rubber and the wearing band of leather. A valve 9 similar to a tire valve extends from the tube 8 passing through an aperture 10 in one of the plates 2.

A handle 11 secured to a bolt 12 forms the means for inserting the plug in the pipe and removing same and when inserted the pressure fluid is forced into the pipe, being tested through the tubes 13 extending from side to side of the plug having a valve 14 connected thereto.

In the construction of Figs. 4 and 5 the plug is made with two similar body portions 15 and 16, these having a concave annular peripheral surface 17, the body sections being bolted together by suitable bolts 18. An expandible packer 19 is formed of an expandible tube having a flat peripheral surface 20 and a curved back wall 21 fitting against the concave surface 17. A valve 22 extends from the tube through an aperture 23 in one of the body sections to allow inflation and deflation of the flexible and resilient packer. This type of plug is preferably made with a hollow recess 24 for the sake of lightness and has a handle 25 connected thereto and also a filling pipe, the same as shown in Figs. 2 and 3.

The manner of operation of the plug of Figs. 1, 2 and 3 is substantially as follows:

The plug is inserted as above mentioned in the open end of a pipe by means of the handle and air may be pumped into the expandible tube 8, this pressing the circumferential portion of the protected cover 4 against the pipe. The pressure may be made as great as desired to form a liquid or air tight seal around the periphery of the plug. Liquid or gas may then be forced through the filling tube to any desired pressure and released by means of the valve 14. The air pressure in the expandible tube may be released through the valve 9 and the plug removed from the pipe.

In connection with the plug of Figs. 4 and 5, the expandible tube is inflated and the peripheral flat surface is forced into close contact with the inside of the pipe, this type of expandible packer is intended to be sufficiently flexible and made of sufficiently soft rubber or equivalent material to make an air tight seal against the tube. After testing the air may be exhausted through the air valve and the plug removed.

As detailed above, the wearing band 6 is preferably constructed of leather as this will not stretch materially and in some cases I coat or cover the surface of this leather with rubber to form a close adherence with the pipe. Therefore, when the plug is submitted to high pressure the leather does not stretch as would be the case where the expanding element of the plug was formed of rubber and had a direct contact with the pipe.

While I have illustrated my invention as applied to a pipe pressure testing plug, it will be apparent that such plugs may be utilized in other fittings and may form if desired, a temporary closure for a pipe or other purposes. My invention may be changed in general construction or in specific details without departing from the spirit thereof as set forth in the description, drawings and claims.

Having described my invention, what I claim is:

1. A pipe plug comprising in combination a supporting structure having a periphery formed concave facing outwardly with the outer edges of said structure on each side thereof substantially equal distances from the axial center, an inflatable tube bearing directly on the supporting structure, and a wearing band extending over the outside portion of the inflatable tube and secured to the sides of the supporting structure.

2. A pipe plug as claimed in claim 1, in which the wearing band has flanges extending inwardly partly over the sides of the supporting structure, with means to secure said flanges to said supporting structure.

3. A pipe plug comprising in combination a supporting structure having its periphery formed concave facing outwardly, the side edges being substantially equal distances from the axial center, an inflatable tube having an inner portion bearing directly on the concave periphery, a wearing band fitted on the outside of the said tube, side plates secured on opposite sides of the supporting structure, and means co-operating with said side plates to secure the wearing band on opposite sides of the supporting structure.

4. A pipe plug as claimed in claim 3, in which the wearing band has side flanges which extend inwardly between the supporting structure and the side plates thereby holding the wearing band in position, the outer periphery of the said wearing band being of greater diameter than the outer periphery of the said side plates.

In testimony whereof I have signed my name to this specification.

ORSON TAYLOR.